US012277194B2

United States Patent
Kompella et al.

(10) Patent No.: US 12,277,194 B2
(45) Date of Patent: Apr. 15, 2025

(54) TASK PRIORITIZED EXPERIENCE REPLAY ALGORITHM FOR REINFORCEMENT LEARNING

(71) Applicants: Sony Corporation, Tokyo (JP); Sony Corporation of America, New York, NY (US)

(72) Inventors: Varun Kompella, Kanata (CA); James MacGlashan, Riverside, RI (US); Peter Wurman, Acton, MA (US); Peter Stone, Austin, TX (US)

(73) Assignee: SONY GROUP CORPORATION, Tokyo (JP)

( * ) Notice: Subject to any disclaimer, the term of this patent is extended or adjusted under 35 U.S.C. 154(b) by 1000 days.

(21) Appl. No.: 17/036,913

(22) Filed: Sep. 29, 2020

(65) Prior Publication Data

US 2022/0101064 A1 Mar. 31, 2022

(51) Int. Cl.
*G06N 7/00* (2023.01)
*G06F 18/21* (2023.01)
*G06F 18/214* (2023.01)
*G06N 20/00* (2019.01)

(52) U.S. Cl.
CPC ........ *G06F 18/2178* (2023.01); *G06F 18/214* (2023.01); *G06N 20/00* (2019.01)

(58) Field of Classification Search
CPC ... G06F 18/2178; G06F 18/214; G06N 20/00; G06N 7/01; G06N 3/006
See application file for complete search history.

(56) References Cited

U.S. PATENT DOCUMENTS

| 2017/0278108 A1 | 9/2017 | Hays et al. |
| 2018/0012137 A1 | 1/2018 | Wright et al. |
| 2018/0165603 A1 | 6/2018 | Seijen et al. |

(Continued)

FOREIGN PATENT DOCUMENTS

| CA | 2993551 C | * 10/2022 | ............. G06N 3/006 |
| JP | 2019529135 A | 10/2019 | |

(Continued)

OTHER PUBLICATIONS

Nan Jiang. A Theory of Model Selection in Reinforcement Learning. 2017, [Retrieved Jan. 9, 2021], Retrieved from https://nanjiang.cs.illinois.edu/files/thesis_jiang.pdf.

(Continued)

*Primary Examiner* — Hassan Mrabi
(74) *Attorney, Agent, or Firm* — INNOVATION CAPITAL LAW GROUP, LLP; Vic Lin

(57) ABSTRACT

A task prioritized experience replay (TaPER) algorithm enables simultaneous learning of multiple RL tasks off policy. The algorithm can prioritize samples that were part of fixed length episodes that led to the achievement of tasks. This enables the agent to quickly learn task policies by bootstrapping over its early successes. Finally, TaPER can improve performance on all tasks simultaneously, which is a desirable characteristic for multi-task RL. Unlike conventional ER algorithms that are applied to single RL task learning settings or that require rewards to be binary or abundant, or are provided as a parameterized specification of goals, TaPER poses no such restrictions and supports arbitrary reward and task specifications.

18 Claims, 2 Drawing Sheets

(56) References Cited

U.S. PATENT DOCUMENTS

| | | | |
|---|---|---|---|
| 2019/0102676 A1 | 4/2019 | Nazari et al. | |
| 2019/0286979 A1 | 9/2019 | Harmer et al. | |
| 2020/0302322 A1* | 9/2020 | Tukiainen | G06N 7/01 |

FOREIGN PATENT DOCUMENTS

| | | | |
|---|---|---|---|
| JP | 2020009416 A | 1/2020 | |
| JP | 2020047285 A | 3/2020 | |
| WO | 2019002465 A1 | 1/2019 | |

OTHER PUBLICATIONS

Annie Xie et al, "Deep Reinforcement Learning amidst Lifelong Non-Stationarity", ArXiv:2006.10701v1 [cs.LG], Jun. 18, 2020, arxiv.org, Cornell University Library, 201 Olin Library Cornell Universtiy Ithaca, NY 14853.

Parijat Dewangan et al, "DiGrad: Multi-Task Reinforcement Learning with Shared Actions", arXiv:1802.10463v1 [cs.LG], Feb. 27, 2018, arxiv.org, Cornell University Library, 201 Olin Library Cornell University Ithaca, NY 14853.

Rui Zhao et al, "Energy-Based Hindsight Experience Prioritization", arXiv:1810.01363v5 [cs.LG], May 24, 2020, Cornell University Library, 201 Olin Library Cornell University Ithaca, NY 14853.

Tom Schaul et al, "Prioritized Experience Replay", arXiv:1511.05952v4, [cs.LG], Google DeepMind, ICLR 2016, Feb. 25, 2016. Retrieved from the Internet: URL:https://arxiv.org/abs/1511.05952v4.

Kuang Yingyi et al., "Goal Density-based Hindsight Experience Prioritization for Multi-Goal Robot Manipulation Reinforcement Learning", 2020 19th IEEE International Conference on Robot and Human Interactive Communication (Ro-Man), IEEE, Aug. 31, 2020, pp. 432-437.

* cited by examiner

TASK PRIORITIZED EXPERIENCE REPLAY ALGORITHM FOR REINFORCEMENT LEARNING

BACKGROUND OF THE INVENTION

1. Field of the Invention

Embodiments of the invention relates generally to reinforcement learning methods. More particularly, the invention relates to systems and methods for training an agent using a task prioritized experience replay algorithm that enables simultaneous learning of multiple reinforcement learning tasks off policy.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Reinforcement learning (RL) describes a class of problems (and solutions) in which an artificial agent optimizes its control of a system (or "environment") when the system dynamics are unknown and must be learned by the agent through interaction and observation. A reinforcement learning system can include four main elements—an agent, a policy, a reward and a value function. An agent's behavior at any point of time is defined in terms of a policy.

A policy, $\pi(a, s)$, is a probabilistic mapping between action, a, and state, s. Because not all policies are optimal, methods are developed to improve a policy. Such methods fall into either on-policy or off-policy methods. On policy methods attempt to evaluate or improve the same policy that is used to make decisions. On the other hand, off policy methods evaluate or improve a policy different from one that was used to generate the data. Off-policy reinforcement learning makes it possible to learn a policy to solve a task from experiences collected from a different behavior policy.

Experience Replay (ER) algorithms play an important role in training gradient-based deep RL architectures. Training these architectures online often require inputs to recur and be temporally uncorrelated. ER algorithms address these issues efficiently by using buffers to store experiences and sampling from them in an independent and identically distributed manner. ER algorithms can further be categorized into two sub-classes, ones that sample experiences uniformly and the others that sample certain experiences with higher priority.

Prior ER algorithms were mostly applied to single RL task learning settings. A few that were applied in multi-task settings require either rewards to be binary or abundant. Some of these also require a parameterized specification of goals.

In view of the foregoing, there is a need for a system and methods that improve upon off-polity reinforcement learning.

SUMMARY OF THE INVENTION

Embodiments of the present invention provide a method of training an agent in a control loop comprising performing, by the agent, an action $(a_t)$ sampled from a behavior policy $(\pi^b)$ for an observation $(s_t)$; storing a transition tuple in a main buffer, the transition tuple including $\{(s_t, a_t, \vec{r}_t, s_{t+1})\}$, where $\vec{r}_t$ is a reward vector for each task in an environment and $s_{t+1}$ is a next environment state after action $(a_t)$; updating transiting priorities for each transition tuple stored in the main buffer; sampling a minibatch of transition tuples to update the task networks; and optimizing task policies from the updated task networks with an off-policy algorithm.

In some embodiments, the tasks in the environment are unknown to the agent.

In some embodiments, the control loop is episodic, and a state of the agent is reset to an initial state after each episode.

In some embodiments, the control loop is continual, where the agent executes actions without resetting a state of the agent.

Embodiments of the present invention further provide a method of training an agent comprising performing, by the agent, an action $(a_t)$ sampled from a behavior policy $(\pi^b)$ for an observation $(s_t)$; storing a transition tuple in a main buffer, the transition tuple including $\{(s_t, a_t, \vec{r}_t, s_{t+1})\}$, where $\vec{r}_t$ is a reward vector for each task in an environment and $s_{t+1}$ is a next environment state after action $(a_t)$; updating transiting priorities for each transition tuple stored in the main buffer; sampling a minibatch of transition tuples to update the task networks; and optimizing task policies from the updated task networks with an off-policy algorithm, wherein transitions that belong to a set of transition indices that result in achievement of task-j during an $i^{th}$ episode are given a priority greater than transitions that do not result in achievement of task-j during the $i^{th}$ episode.

Embodiments of the present invention also provide a non-transitory computer-readable storage medium with an executable program stored thereon, wherein the program instructs one or more processors to perform the following steps performing, by the agent, an action $(a_t)$ sampled from a behavior policy $(\pi^b)$ for an observation $(s_t)$; storing a transition tuple in a main buffer, the transition tuple including $\{(s_t, a_t, \vec{r}_t, s_{t+1})\}$, where $\vec{r}_t$ is a reward vector for each task in an environment and $s_{t+1}$ is a next environment state after action $(a_t)$; updating transiting priorities for each transition tuple stored in the main buffer; sampling a minibatch of transition tuples to update the task networks; and optimizing task policies from the updated task networks with an off-policy algorithm, wherein transitions that belong to a set of transition indices that result in achievement of task-j during an $i^{th}$ episode are given a priority greater than transitions that do not result in achievement of task-j during the $i^{th}$ episode.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
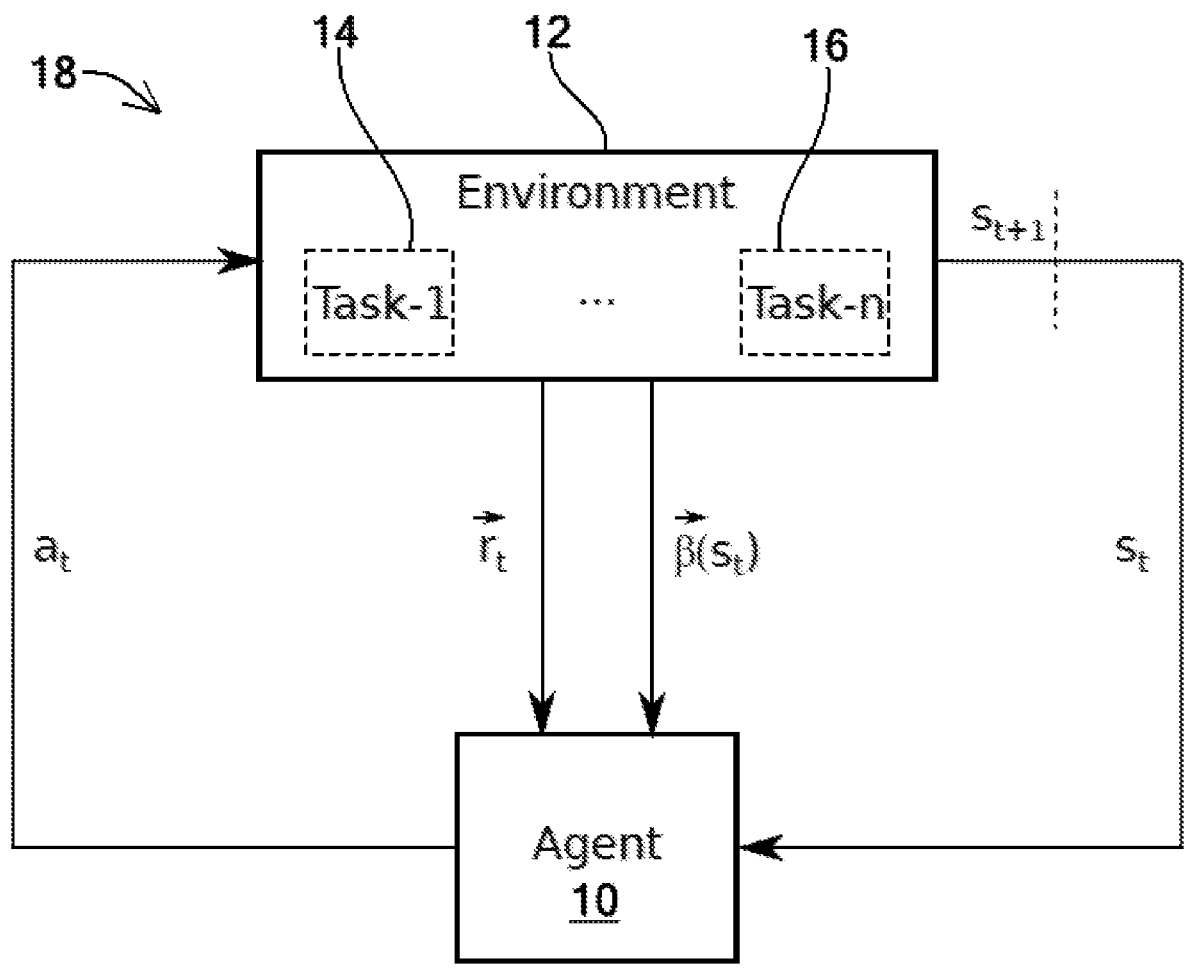
FIG. 1 illustrates a control flow diagram between an environment and an agent equipped with TaPER according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Embodiments of the present invention may include apparatuses for performing the operations disclosed herein. An apparatus may be specially constructed for the desired purposes, or it may comprise a general-purpose device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

The term "agent" or "intelligent agent" or "artificial agent" or "artificial intelligent agent" is meant to refer to any man-made entity that chooses actions in response to observations. "Agent" may refer without limitation to a robot, to a simulated robot, to a software agent or "bot", an adaptive agent, an internet or web bot.

The term "robot" may refer to any system controlled directly or indirectly by a computer or computing system that issues actions or commands in response to senses or observations. The term may refer without limitation to a traditional physical robot with physical sensors such as cameras, touch sensors, range sensors, and the like, or to a simulated robot that exists in a virtual simulation, or to a "bot" such as a mailbot or searchbot that exists as software in a network. It may without limitation refer to any limbed robots, walking robots, industrial robots (including but not limited to robots used for automation of assembly, painting, repair, maintenance, etc.), wheeled robots, vacuum-cleaning or lawn-mowing robots, personal assistant robots, service robots, medical or surgical robots, flying robots, driving robots, aircraft or spacecraft robots, or any other robots, vehicular or otherwise, real or simulated, operating under substantially autonomous control, including also stationary robots such as intelligent household or workplace appliances.

The terms "observation" or "observations" refers to any information the agent receives by any means about the agent's environment or itself. In some embodiments, that information may be sensory information or signals received through sensory devices, such as without limitation cameras, touch sensors, range sensors, temperature sensors, wavelength sensors, sound or speech sensors, position sensors, pressure or force sensors, velocity or acceleration or other motion sensors, location sensors (e.g., GPS), etc. In other embodiments that information could also include without limitation compiled, abstract, or situational information compiled from a collection of sensory devices combined with stored information. In a non-limiting example, the agent may receive as observation abstract information regarding the location or characteristics of itself or other objects. In some embodiments this information may refer to people or customers, or to their characteristics, such as purchasing habits, personal contact information, personal preferences, etc. In some embodiments, observations may be information about internal parts of the agent, such as without limitation proprioceptive information or other information regarding the agent's current or past actions, information about the agent's internal state, or information already computed or processed by the agent.

The term "action" refers to the agent's any means for controlling, affecting, or influencing the agent's environment, the agent's physical or simulated self or the agent's internal functioning which may eventually control or influence the agent's future actions, action selections, or action preferences. In many embodiments the actions may directly control a physical or simulated servo or actuator. In some embodiments the actions may be the expression of a preference or set of preferences meant ultimately to influence the agent's choices. In some embodiments, information about agent's action(s) may include, without limitation, a probability distribution over agent's action(s), and/or outgoing information meant to influence the agent's ultimate choice of action.

The term "state" or "state information" refers to any collection of information regarding the state of the environment or agent, which may include, without limitation, information about the agent's current and/or past observations.

The term "policy" refers to any function or mapping from any full or partial state information to any action information. Policies may be hard coded or may be modified, adapted or trained with any appropriate learning or teaching method, including, without limitation, any reinforcement-learning method or control optimization method. A policy may be an explicit mapping or may be an implicit mapping, such as without limitation one that may result from optimizing a particular measure, value, or function. A policy may include associated additional information, features, or characteristics, such as, without limitation, starting conditions (or probabilities) that reflect under what conditions the policy may begin or continue, termination conditions (or probabilities) reflecting under what conditions the policy may terminate.

Broadly, embodiments of the present invention provide a task prioritized experience replay (TaPER) algorithm that enables simultaneous learning of multiple RL tasks off policy. The algorithm can prioritize samples that were part of fixed length episodes that led to the achievement of tasks. This enables the agent to quickly learn task policies by bootstrapping over its early successes. Finally, TaPER can improve performance on all tasks simultaneously, which is a desirable characteristic for multi-task RL. Unlike conventional ER algorithms that are applied to single RL task learning settings or that require rewards to be binary or abundant, or are provided as a parameterized specification of goals, TaPER poses no such restrictions and supports arbitrary reward and task specifications.

TaPER satisfies a number of desirable properties for multi-task RL. For example, TaPER improves performance on all tasks simultaneously. This characteristic is desirable when sharing parameters between task networks. TaPER supports transfer learning between the tasks by sharing data that is prioritized for one task with the other. An agent equipped with TaPER quickly learns task policies by bootstrapping over its early success as compared to uniform experience replay. Finally, TaPER uses a stochastic prioritization method, which helps in resisting overfitting, especially in early stages when only a few experiences have been collected.

As discussed in greater detail below, embodiments of the present invention generally relate to systems and computerized methods of prioritized off policy RL using a task prioritized experience replay algorithm. The systems and computerized methods provide a technical improvement in the efficiency and accuracy of computer systems by enabling simultaneous learning of multiple RL tasks off policy, by prioritizing samples that were part of fixed length episodes that led to the achievement of tasks, by enabling the agent to quickly learn task policies by bootstrapping over its early successes, and by improving performance on all tasks simultaneously.

The algorithmic implementation of TaPER, in the context of a multi-task RL setting, is described herein with reference to the following notation, where n is the number of available tasks to learn;

$s_t$ is an observation of the environment state at time t;

$a_t$ is an action selection that can be executed in the environment at time t;

$\pi^b(s_t)$ is the action probability distribution parameters of the agent's behavior policy for observation $s_t$. At any time t, the agent executes an action $a_t$ sampled from $\pi^b(s_t)$;

$\vec{r}_t$ is a reward vector $\{r_t^1 \ldots r_t^n\}$ where each component $r_t^n$ is a scalar reward signal received by the agent at the $i^{th}$ task;

$\beta^j(s_t) \in \{0, 1\}$ is a termination function for each task j that returns a binary value 0 or 1 for a given observation $s_t$. If $\beta^j$ returns 1 then the task has terminated; otherwise it returns 0;

$\vec{\beta}(s_t) = \{\beta^1(s_t), \ldots, \beta^n(s_t)\}$ denotes the binary termination vector for all tasks. Tasks' termination values may not affect the agent's behavior policy $\pi^b(s_t)$;

transition refers to a tuple $(s_t, a_t, \vec{r}_t, s_{t+1})$;

episode: a sequence of T transitions, where T is a fixed integer;

$\mathcal{D}$ is the main buffer that stores all observed transitions;

$\varepsilon$ is an episode-buffer that stores the indices of transitions observed during an ongoing episode;

task achieved refers to, within the context of an episode, a task-j that is considered achieved if the condition $\exists k \in \varepsilon$, s.t. $\beta^j(s_k)=1$ holds;

$\mathcal{I}_i^j$ denotes a set of transition indices that resulted in the achievement of a task-j during the $i^{th}$ episode. $\mathcal{I}_i^j$ denotes the union over all tasks and $\mathcal{I}_i^j$ denotes the union over all tasks and episodes;

|X| denotes the number of samples stored in a buffer X. For example, $|\mathcal{D}|$ denotes the number of transitions stored in the main buffer;

$p_i$ is the priority value of a transition with an index i stored in the main buffer;

P(i) is the probability of sampling a transition with an index i from the main buffer;

B P$\mathcal{D}$ denotes a minibatch of transitions B sampled from D with a probability distribution P defined over transition indices;

$\pi^i(s_t)$ is the action probability distribution parameters of an updating task $-i$'s policy for observation $s_t$. When learned, $\pi^i$ solves the task optimally; and $\mathbb{A}$ is an off-policy RL algorithm that optimizes task policy $\pi^i$ networks.

TaPER makes the following assumptions about the environment:

the agent interacts with the environment in discrete time steps;

starting from t=0, the agent is presented with n tasks to solve. The agent knows the number n but not the task descriptions;

at any given time t, the agent can observe the reward signal for all tasks. That is, the agent knows the value of $\vec{r}_t$;

at any given time t and the corresponding observation $s_t$, the agent can observe the termination values $\beta(s_t)$ for all tasks. That is, the agent knows the value of $\vec{\beta}(s_t)$; and the agent's behavior policy $\pi^b$ needs to be exploratory enough for the agent to reach the termination states of each task at least once.

Referring to FIG. 1, an overview of an agent 10 that uses TaPER to learn in a multi-task RL setting is illustrated. A high-level control flow between the agent 10 and the environment 12 is illustrated in FIG. 1. The environment 12 can include n task descriptions, Task-1 14 through Task-n 16, unknown to the agent. At any time t and with the observed environment state $s_t$, the agent 10 can execute an action $a_t$ and observes the next environment state $s_{t+1}$. The agent 10 can also receive scalar rewards $\vec{r}_t$ and binary termination values $\vec{\beta}$ from all the tasks. The transition tuple $(s_t, a_t, \vec{r}_t, s_{t+1})$ and the termination vector $\vec{\beta}(s_t)$ are used to update the internals of the agent 10. This control loop 18 can continue indefinitely or until all the tasks are considered to be solved.

The agent's control loop 18 can be categorized broadly as (a) episodic or (b) continual. In the episodic case, at the end of each episode, the agent's state is reset to an initial state (that can be different from its last observed state). Episodes in this case have non-overlapping transitions. In the continual case, however, the agent continues executing actions without a reset. This case can be treated as a special case of episodic, where the agent's initial state is the last observed state. An episode in the continual loop is considered to be a moving window of T−1 overlapping transitions.

Figure 2:
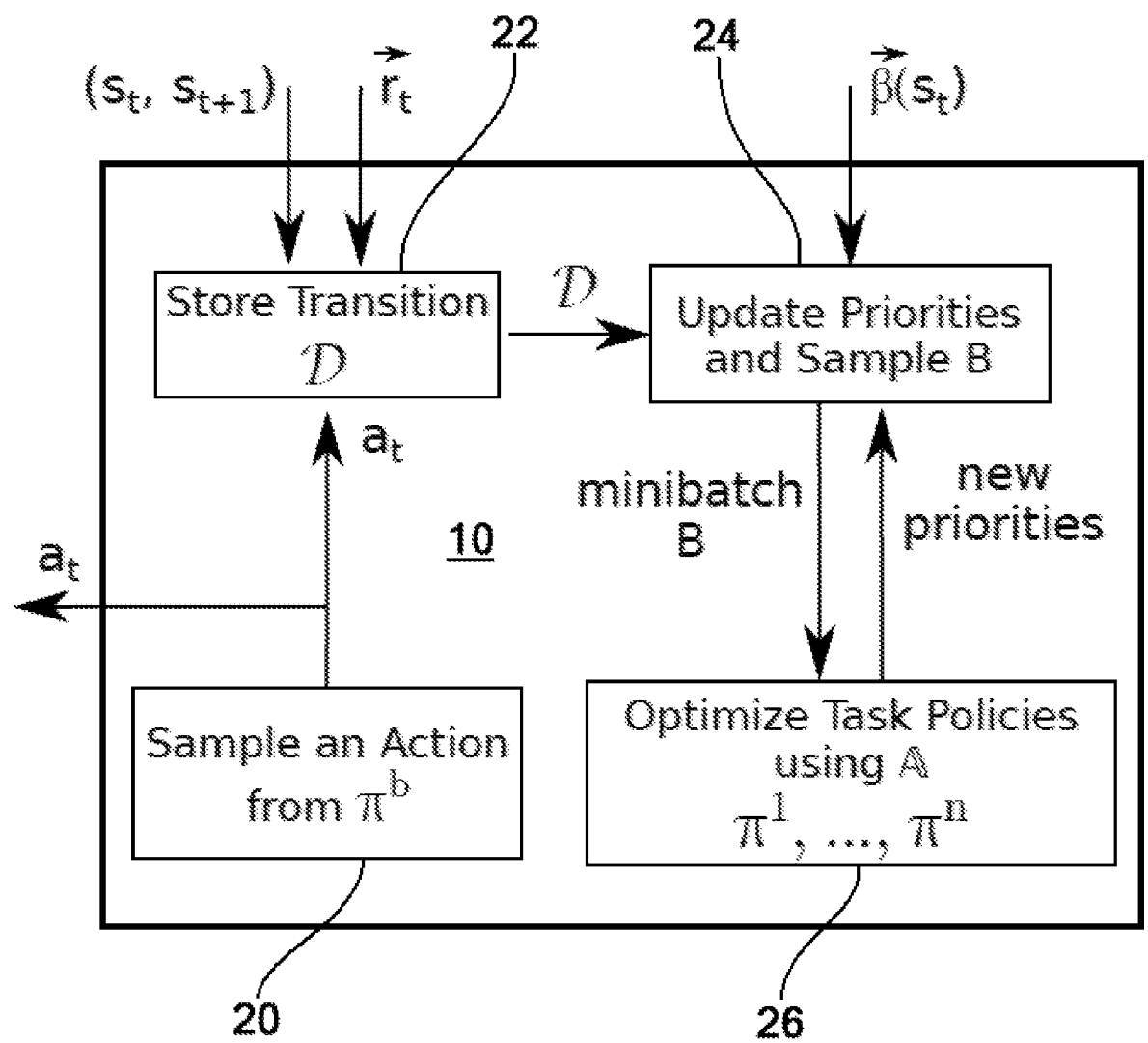
FIG. 2 illustrates internals of an off-policy reinforcement agent using TaPER, according to an exemplary embodiment of the present invention.

The agent can include four operational blocks summarized as follows, going clockwise in FIG. 2: (1) Sample an action block 20 can return an action at sampled from the behavior policy $\pi^b$ for the observation $s_t$; (2) Store transition block 22 can store the new transition in the main buffer $\mathcal{D}$; (3) Update priorities and sample a minibatch (B) block 24 can update transition priorities and $\mathcal{D}$ samples a minibatch of transitions B; and (4) Optimize task policies block 26 can perform optimization steps of task policies using an off policy algorithm $\mathbb{A}$ and the minibatch B.

Sample an Action

Regarding the sample an action block 20, the agent 10 has an exploratory behavior policy $\pi^b$ that it uses to sample and execute an action at every time step. The behavior policy can be independent of the task policies $\pi^i$, $\forall i$. A default choice for a behavior policy is a uniform-random policy. However, in complex environments a uniform-random policy might not be sufficient to explore effectively. Other choices include using optimistic biases for unseen regions, human designed policies, and the like.

Store Transition

Regarding the store transition block 22, an action sampled from the behavior policy can be used to construct a new transition $(s_t, a_t, \vec{r}_t, s_{t+1})$, which gets stored in a main buffer $\mathcal{D}$. The main buffer can be implemented using an unsized queue container or a finite sized first-in-first-out queue if there are memory constraints. The TaPER algorithm is agnostic to the memory design choices of the main buffer. The algorithm only requires that the transitions be indexed and ordered in time, where a new transition has the highest index (so far) associated to it.

Update Priorities and Sample a Minibatch

Regarding the update priorities and sample a minibatch block 24, this block 24 has two subparts: (a) update transition priorities and (b) sample a minibatch.

(a) Update Transition Priorities

With respect to the update transition priorities subpart, the below details how the transition priorities are computed. Let i denote the episode buffer $\varepsilon_i$ for $i^{th}$ episode. The set of transition indices that resulted in the achievement of a task-j during the $i^{th}$ episode is given by:

$$\mathcal{T}_i^j = \bigcup_{\forall t, \hat{p}^j(s_t)=1} \varepsilon_i[0:t], \quad (1)$$

where $\varepsilon_i[0:1]$ denotes the set of transition indices from the start of the episode to t time steps. $\mathcal{T}_i^j$ is the union over all tasks and observed episodes:

$$\mathcal{T}_i^j = \bigcup_i \mathcal{T}_i^j, \forall j \in [1,n]. \quad (2)$$

One focus of TaPER is that the transitions that belong to $\mathcal{T}_i^j$ are prioritized over the ones that are not in $\mathcal{T}_i^j$. Two variants are considered to set the priority values for each transition. The first variant sets a constant priority value to all the transitions that belong to $\mathcal{T}_i^j$:

$$p_i = \begin{cases} 1 & \text{if } i \in \mathcal{T} \\ \epsilon & \text{otherwise} \end{cases}. \quad (3)$$

A small non-zero priority value $\epsilon$ for transitions that are outside $\mathcal{T}_i^j$ to not exclude them from sampling entirely.

A second variant of prioritization is also considered, where the magnitude of a transition's temporal-difference error $\delta$ is used to prioritize also between the samples within $\mathcal{T}_i^j$ $$p_i = \begin{cases} |\delta_i| + \epsilon & \text{if } i \in \mathcal{T} \\ \epsilon & \text{otherwise.} \end{cases} \quad (4)$$

The temporal-difference error $\delta$ is a reasonable proxy for learning progress of an RL algorithm. For example, in the standard Q-learning algorithm, $\delta$ is given by $r+Q(s_{t+1}, \arg\max_a Q(s_{t+1}, a))-Q(s_t, a_t)$. So, by using the magnitude of $\delta$ as a priority value, transitions that are useful in speeding up learning are prioritized over the ones that are not. $\epsilon$ is added to make sure that the priority $(|\delta_i|+\epsilon)$ is non-zero.

There are trade-offs between both variants. The second variant seems more appealing as it can potentially speed up learning by focusing on transitions that result in faster learning progress. However, it is computationally expensive because $\delta$ changes with time and therefore the priorities need to be constantly updated after each optimization step. This can also affect network latency if the buffers are stored remotely in cloud. Compute is not an issue with the first variant as the priorities are only set once. Depending on the network and computational budget, selecting a variant is a design choice of the TaPER algorithm. The discussion below relies on use of the first variant.

(b) Sample Minibatch

With the priorities set, next a minibatch of transitions can be sampled to update the task networks. Just using the priority values to sample a minibatch, especially when the size of the set $\mathcal{T}_i^j$ is small, could result in a premature convergence of policies over the small set $\mathcal{T}_i^j$ (overfitting). To deal with these issues, a stochastic prioritization approach of interpolating between greedy prioritization and uniform random sampling can be used:

$$P(i) = \frac{p_i^\alpha}{\sum_k p_k^\alpha}, \quad (5)$$

where $\alpha \in [0, 1]$ determines how much prioritization to use. Since $p_i$ is non-zero, all transitions have a non-zero probability of being selected. By setting $\alpha=0$, TaPER reduces to uniform sampling ER. It is advisable to set $\alpha$ closer to 0 in the beginning and to increment its value over time to 1. This makes TaPER behave mostly like uniform ER early on, such that it avoids overfitting over transitions referenced in a small $\mathcal{T}_i^j$. Using the transition probabilities, a minibatch B of transitions is sampled from $\mathcal{D}$ to optimize task policies.

Optimize Task Policies

The sampled minibatch of transitions B is used to update task policy networks using the off-policy algorithm $\mathbb{A}$. For the temporal-difference (TD) error prioritization variant (Equation 4, above), TD errors computed by $\mathbb{A}$ are used to update the priorities for the transitions in B. TaPER is agnostic to the choice of the algorithm $\mathbb{A}$.

Algorithm 1, below, describes the episodic TaPER algorithm formally in the context of a multi-task RL setting. For the continual case, the buffer E is implemented as a moving window of size T, instead of a hard reset at the end of each episode.

Algorithm 1: Task-Prioritized Experience Replay (Episodic)

```
   // input parameters: n — number of tasks, T — episode length
1  𝒟 ← { }
2  for episode i = 1 to ∞ do
3     𝒥_j ← { }, ε ← { }
4     for t = 0 to T − 1 do
5        s_t ← current state observation
6        execute action at sampled from π^b(s_t)
7        observe r⃗_t, β⃗_(s_t) and next state s_{t+1}
         // store transition in main buffer with a priority p_i = ε
8        𝒟 ← 𝒟 ∪ { (s_t, a_t, r⃗_t, s_{t+1}) }
9        ε ← ε ∪ { |𝒟| } // store last transition index
10       for each β^j(s_t) in β⃗(s_t) do
11          if β^j(s_t) then
12             𝒥 ← 𝒥 ∪ ε // task-j achieved, store transition indices
13          end
14       end
15    end
16    Update transition priority pj ← 1, ∀j ∈ 𝒥_j
17    B ℙ 𝒟 // sample minibatch according to Equation (5)
18    Update task policies π^1, ... , π^n using 𝔸 and B
19 end
```

As discussed above, a task prioritized experience replay (TaPER) algorithm enables simultaneous learning of multiple RL tasks off policy. The algorithm prioritizes samples that were part of fixed length episodes that led to the achievement of tasks. This enables the agent to quickly learn task policies by bootstrapping over its early successes. Finally, the TaPER algorithm improves performance on all tasks simultaneously, which is a desirable characteristic for multi-task RL.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

The claims are thus to be understood to include what is specifically illustrated and described above, what is conceptually equivalent, what can be obviously substituted and also what incorporates the essential idea of the invention.

What is claimed is:

1. A method of training an agent in a control loop, comprising:
   performing, by the agent, an action ($a_t$) sampled from a behavior policy ($\pi^b$) for an observation ($s_t$), wherein the observation comprises information the agent receives, by any means, about an environment of the agent or the agent itself, wherein the information includes one or more of sensory information or signals received through sensory devices; compiled, abstract, or situational information compiled from a collection of the sensory devices combined with stored information; information about people or customers, or to characteristics of the people or the customers; information about internal parts of the agent; proprioceptive information; information regarding current or past actions of the agent; information about an internal state of the agent; information already computed or processed by the agent; and a termination value for each task of a plurality of tasks for which the agent is being trained;
   storing a transition tuple in a main buffer of the agent, the transition tuple including $\{(s_t, a_t, \vec{r}_t, s_{t+1})\}$, where $\vec{r}_t$ is a reward vector for each task of the plurality of tasks for the agent in an environment and $s_{t+1}$ is a next environment state after action ($a_t$);
   storing a priority value p(i), of the transition tuple with index i in the main buffer;
   determining a probability, P(i) of sampling the transition tuple with the index i from the main buffer;
   updating transiting priorities for each transition tuple stored in the main buffer;
   sampling a minibatch of transition tuples to update the task networks based on the stored priority value p(i) thereof;
   determining an action probability distribution parameter, $\pi^i(s_t)$, of updating task policies for the observation $s_t$; and
   optimizing the task policies from the updated task networks with an off-policy algorithm, wherein:
   data that is prioritized for one task is shared with one or more other tasks to transfer learning between multiple tasks.

2. The method of claim 1, further comprising continuing the control loop until all the tasks in the environment are solved.

3. The method of claim 1, wherein the tasks in the environment are unknown to the agent.

4. The method of claim 1, wherein the control loop is episodic, and a state of the agent is reset to an initial state after each episode.

5. The method of claim 1, wherein the control loop is continual, where the agent executes actions without resetting a state of the agent.

6. The method of claim 1, wherein the behavior policy is a uniform-random policy.

7. The method of claim 1, wherein the behavior policy is selected from a policy using optimistic biases for unseen regions or a human-designed policy.

8. The method of claim 1, wherein transitions that belong to $\mathcal{J}_i^j$ are giving a priority greater than transitions that are not in $\mathcal{J}_i^j$.

9. The method of claim 8, wherein a priority value to the transitions that belong to $\mathcal{J}_i^j$ are given a constant value.

10. The method of claim 9, wherein transitions that are not in J are given a non-zero priority value.

11. The method of claim 8, wherein a priority value to the transitions that belong to $\mathcal{T}_i^j$ are given a variable value based on a magnitude of each transition's temporal-difference error.

12. The method of claim 1, wherein the sampling of the minibatch is performed using a stochastic prioritization approach of interpolating between greedy prioritization.

13. The method of claim 1, wherein the step of optimizing the task policies is agnostic to a choice of the off-policy algorithm.

14. A method of training an agent, comprising:
performing, by the agent, an action ($a_t$) sampled from a behavior policy ($\pi^b$) for an observation ($s_t$), wherein the observation comprises information the agent receives, by any means, about an environment of the agent or the agent itself, wherein the information includes one or more of sensory information or signals received through sensory devices;
compiled, abstract, or situational information compiled from a collection of the sensory devices combined with stored information; information about people or customers, or to characteristics of the people or the customers; information about internal parts of the agent;
proprioceptive information; information regarding current or past actions of the agent;
information about an internal state of the agent; and information already computed or processed by the agent; and a termination value for each task of a plurality of tasks for which the agent is being trained;
storing a transition tuple in a main buffer of the agent, the transition tuple including $\{(s_t, a_t, \vec{r}_t, s_{t+1})\}$, where $\vec{r}_t$ is a reward vector for each task of the plurality of tasks for the agent in an environment and $s_{t+1}$ is a next environment state after action ($a_t$);
storing a priority value p(i), of the transition tuple with index i in the main buffer;
determining a probability, P(i) of sampling the transition tuple with the index i from the main buffer;
determining an action probability distribution parameter, $\pi^j(s_t)$, of updating task policies for the observation $s_t$;
updating transiting priorities for each transition tuple stored in the main buffer;
sampling a minibatch of transition tuples to update the task networks based on the stored priority value p(i) thereof; and
optimizing task policies from the updated task networks with an off-policy algorithm, wherein
transitions that belong to a set of transition indices that result in achievement of task-j during an $i^{th}$ episode are given a priority greater than transitions that do not result in achievement of task-j during the $i^{th}$ episode; and
data that is prioritized for one task is shared with one or more other tasks to transfer learning between multiple tasks.

15. The method of claim 14, wherein a priority value to the transitions that belong to the set of transition indices that result in achievement of task-j during the $i^{th}$ episode are given a constant value and transitions that are not in the set of transition indices that result in achievement of task-j during the $i^{th}$ episode are given a non-zero priority value.

16. The method of claim 14, wherein a priority value to the transitions that belong to the set of transition indices that result in achievement of task-j during the $i^{th}$ episode are given a variable value based on a magnitude of each transition's temporal-difference error.

17. A non-transitory computer-readable storage medium with an executable program stored thereon, wherein the program instructs one or more processors to perform the following steps:
performing, by the agent, an action ($a_t$) sampled from a behavior policy ($\pi^b$) for an observation ($s_t$), wherein the observation comprises information the agent receives, by any means, about an environment of the agent or the agent itself, wherein the information includes one or more of sensory information or signals received through sensory devices;
compiled, abstract, or situational information compiled from a collection of the sensory devices combined with stored information; information about people or customers, or to characteristics of the people or the customers; information about internal parts of the agent;
proprioceptive information; information regarding current or past actions of the agent;
information about an internal state of the agent; and information already computed or processed by the agent; and a termination value for each task of a plurality of tasks for which the agent is being trained;
storing a transition tuple in a main buffer of the agent, the transition tuple including $\{(s_t, a_t, \vec{r}_t, s_{t+1})\}$, where $\vec{r}_t$ is a reward vector for each task of the plurality of tasks for the agent in an environment and $s_{t+1}$ is a next environment state after action ($a_t$);
storing a priority value p(i), of the transition tuple with index i in the main buffer;
determining a probability, P(i) of sampling the transition tuple with the index i from the main buffer;
determining an action probability distribution parameter, $\pi^j(s_t)$, of updating task policies for the observation $s_t$;
updating transiting priorities for each transition tuple stored in the main buffer;
sampling a minibatch of transition tuples to update the task networks based on the stored priority value p(i) thereof; and
optimizing task policies from the updated task networks with an off-policy algorithm, wherein
transitions that belong to a set of transition indices that result in achievement of task-j during an $i^{th}$ episode are given a priority greater than transitions that do not result in achievement of task-j during the $i^{th}$ episode; and
data that is prioritized for one task is shared with one or more other tasks to transfer learning between multiple tasks.

18. The non-transitory computer-readable storage medium of claim 17, wherein either (a) a priority value to the transitions that belong to the set of transition indices that result in achievement of task-j during the $i^{th}$ episode are given a constant value and transitions that are not in the set of transition indices that result in achievement of task-j during the $i^{th}$ episode are given a non-zero priority value; or (b) the priority value to the transitions that belong to the set of transition indices that result in achievement of task-j during the $i^{th}$ episode are given a variable value based on a magnitude of each transition's temporal-difference error.

* * * * *